United States Patent

Cash

[11] Patent Number: 5,967,733
[45] Date of Patent: Oct. 19, 1999

[54] HYDRAULIC TILT TRAILER

[75] Inventor: Russell Cash, Elba, Ala.

[73] Assignee: Cash Brothers Leasing, Inc., Elba, Ala.

[21] Appl. No.: 08/990,039

[22] Filed: Dec. 12, 1997

[51] Int. Cl.⁶ .................................................. B60P 1/28
[52] U.S. Cl. ........................................ 414/483; 414/494
[58] Field of Search ...................... 414/471, 480, 414/482, 483, 494, 500; 298/22 AE

[56] References Cited

U.S. PATENT DOCUMENTS

| | | | |
|---|---|---|---|
| 3,055,710 | 9/1962 | Black | 298/22 AE X |
| 3,288,315 | 11/1966 | Bigden | 414/483 X |
| 3,406,852 | 10/1968 | Winckler | 414/483 |
| 3,433,503 | 3/1969 | Davis | 280/512 |
| 3,450,281 | 6/1969 | Groberg | 414/483 X |
| 3,964,626 | 6/1976 | Arregui | 414/480 |
| 4,051,968 | 10/1977 | Massey | 414/500 X |
| 4,133,440 | 1/1979 | Heidrick, Jr. | 414/483 |
| 4,243,353 | 1/1981 | Reed | 414/491 X |
| 4,283,073 | 8/1981 | Gostomski et al. | 280/508 |
| 4,320,907 | 3/1982 | Eaton | 280/511 |
| 4,806,061 | 2/1989 | Fenton | 414/483 X |
| 4,954,039 | 9/1990 | Johnston et al. | 414/480 X |
| 4,958,978 | 9/1990 | Shedleski | 414/483 |
| 5,033,931 | 7/1991 | Mann | 414/480 |
| 5,184,872 | 2/1993 | Larochelle et al. | 414/483 X |
| 5,234,308 | 8/1993 | Mann | 414/480 |
| 5,308,213 | 5/1994 | Gilbertson | 414/482 |
| 5,324,160 | 6/1994 | Smith | 414/475 |
| 5,460,473 | 10/1995 | LaMora et al. | 414/494 |

FOREIGN PATENT DOCUMENTS

| | | | |
|---|---|---|---|
| 2319652 | 12/1973 | Germany | 414/480 |
| 2833931 | 2/1980 | Germany | 414/483 |

*Primary Examiner*—James W. Keenan
*Attorney, Agent, or Firm*—Charles D. Gunter, Jr.

[57] ABSTRACT

A hydraulic tilt frame trailer is shown having a main support frame which is tiltable between a generally horizontal position and a rearwardly inclined position for loading and unloading a freight container. The tilt frame is connected to the main support frame by a first pivot point and has an opposite extent which is connectable to a hauling vehicle at a ball connection which forms a second pivot point. The main frame and tilt frame are hydraulically actuated for tilting the main support frame at an upwardly inclined angle and for simultaneously tilting the tilt frame at an opposite, upwardly inclined angle, whereby the main support frame is tilted to the rearwardly inclined position for loading an unloading a container.

12 Claims, 4 Drawing Sheets

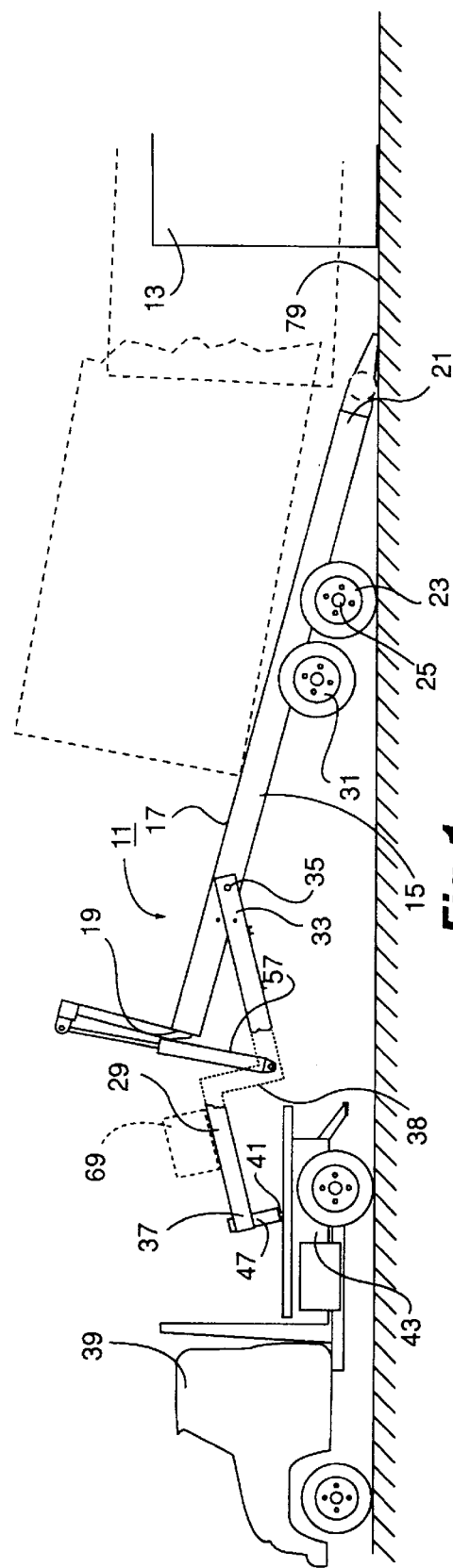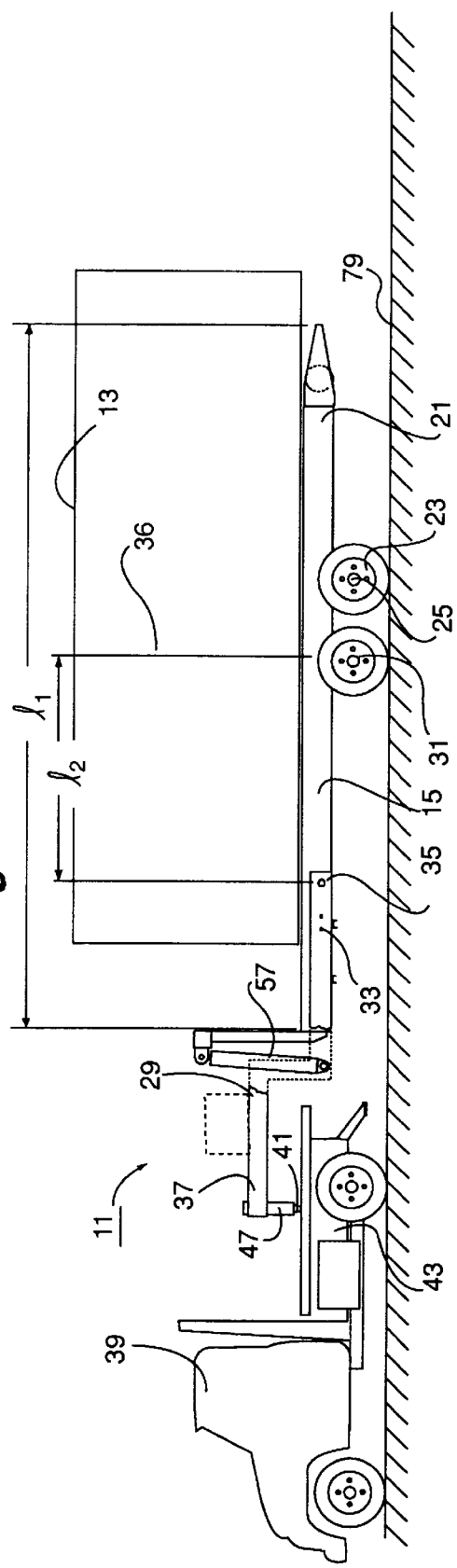

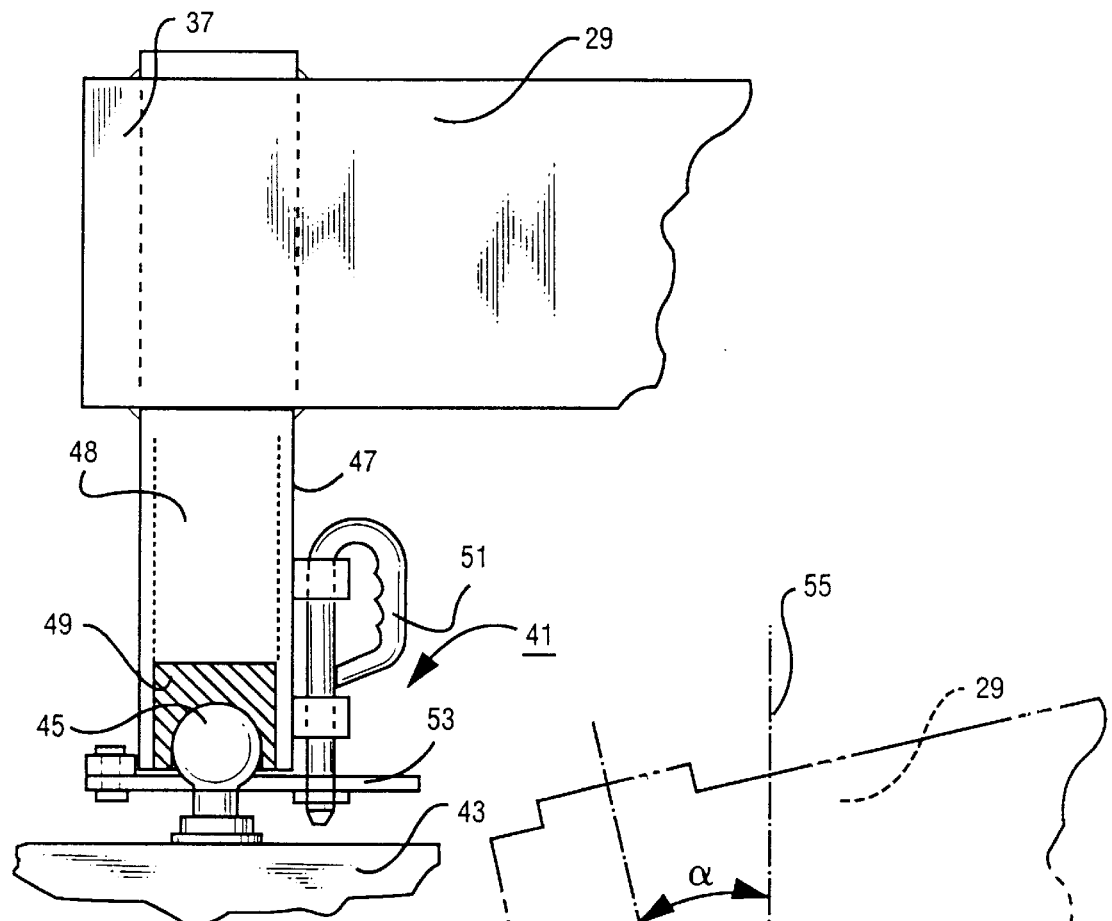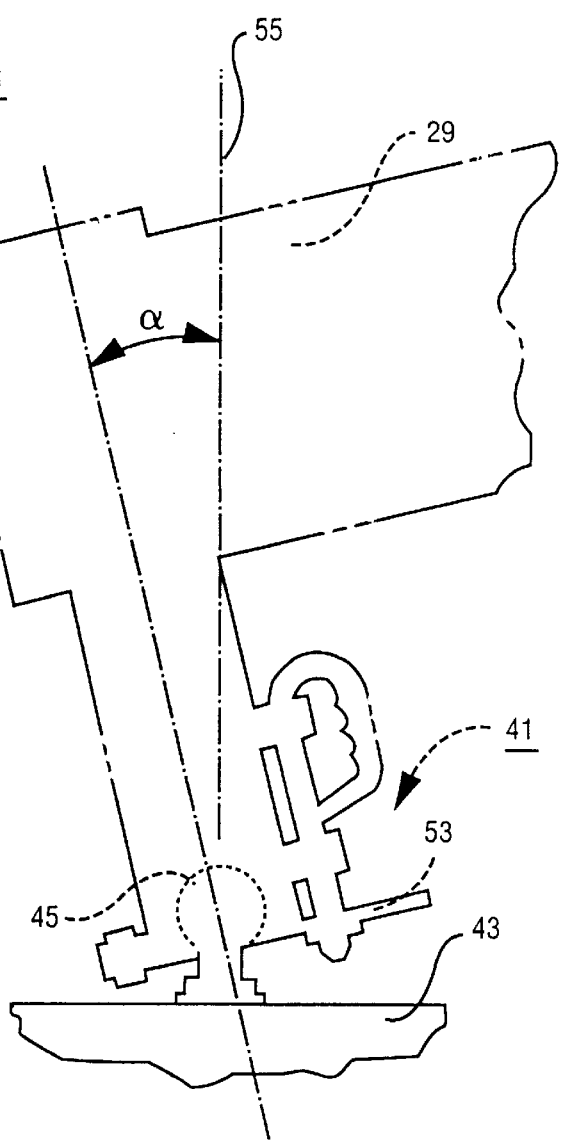
FIG. 4
FIG. 5

HYDRAULIC TILT TRAILER

BACKGROUND OF THE INVENTION

1. Field of the Invention

The present invention relates generally to roll-on and roll-off trailers for transporting objects and, more specifically, to an improved tiltable trailer for transporting containers between locations such as between job sites and storage sites.

2. Description of the Prior Art

A great variety of trailers are known in the prior art for transporting "containers" in both residential and commercial type applications. Although the size of such containers varies with the industry, many businesses use large containers of the type similar to sea cargo containers. These containers typically have dimensions, on the order of, 10 feet high by 40 feet long with a weight on the order of 9,000 pounds or more. Such containers provide an economical method for moving items and can also be used for temporary storage. In the typical case, the storage container is transported to a site and is unloaded and left for a period of time during which period the container is loaded. Once loaded, the container is transported to a new location for unloading or storage.

Although such containers provide a convenient mechanism for moving and temporarily storing freight, household items, business inventory, refuse, and the like, handling of the containers presents a problem. In some cases, loading and unloading of such containers from the trailer is accomplished by a fork lift or other similar industrial lifting equipment.

Another solution to the problem of handling such large containers is the use of detachable container systems known as roll-on, roll-off arrangements. These systems typically feature a bed or frame which tilts to facilitate the loading or unloading operation.

One type of trailer for transporting removable containers in common use is the refuse trailer which is typically towed by a tractor rig and which is outfitted with hydraulic and/or electric systems for loading, unloading or otherwise handling the removable container. These type trailers are used for transporting empty refuse containers from a storage terminal to a job site where the container is typically left behind for the collection of refuse, solid waste or like material. The full container is eventually collected and taken to a dumping depot, or back to a storage terminal. The containers are typically of heavy steel construction and are made to carry heavy loads which vary greatly in nature, i.e., garbage, industrial or commercial wastes or by-products, etc.

The trailer used in refuse loading and unloading operations has typically been provided with an undercarriage carrying a tilt frame. The tilt frame is moveable between a level position for transport and an inclined position for loading and unloading from the rear of the trailer. In the inclined position, the tilt frame defines a single piece ramp which slopes at a uniform angle. A container, resting on the ground, is hoisted onto the ramp. The tilt frame is then lowered back to a level position for stably transporting the container over the road. To unload the container, the tilt frame is tilted to again allow the container to slide off. A chain drive or cable mechanism is usually present to control the movement of the container. U.S. Pat. No. 5,460,473, issued Oct. 24, 1995 and U.S. Pat. No. 5,324,160, issued Jun. 28, 1994, are typical of tilt bed trailers used for transporting containers of the above type.

While the tilt trailer systems of the type described have met the needs of particular job applications, certain drawbacks have continued to exist. These type tilt trailer systems have, in the past, been powered by specially constructed, single purpose trucks. Also, the prior art devices have often required specially designed and built containers, for example containers equipped with wheels and roller systems. Also, the tilting mechanisms of the prior art devices have often been complicated in nature, expensive to build and difficult to maintain. In some cases, the containers being handled were drug over the ground or surrounding substrate with consequent wear or damage to the container undersides.

In certain industries, the containers which are required to be transported are of such a size and weight as to be transportable by a trailer of simpler design which can be hauled by a general purpose truck. For example, some retail stores such as Walmart, K-Mart, and the like utilize storage containers containing retail goods which are of predictable, basically non-perishable nature with the containers being stored on the retail store premises, at least temporarily. At times, it is only necessary that the container being used for storage be moved from one location on the storage lot to another. On other occasions, it may be necessary to transport the container to or from a retail location over an interstate highway. It would be desirable to provide a trailer for transporting the containers used in such industries which was of simpler and less costly design than the typical refuse collection trailer system. Ideally, this special purpose trailer would be hauled by a standard, general purpose hauling vehicle, rather than by a special purpose vehicle or semi-rig. A standard truck would be less expensive and easier to maneuver in tighter spaces. It could also be detached from the trailer and used for other purposes.

Accordingly, the present invention has as its object to provide a trailer for transporting containers which uses a simple tilt mechanism which is economical to manufacture, yet which is durable in construction and easy to maintain.

Another object of the invention is to provide such a trailer for transporting containers with a novel tilt mechanism which utilizes a centrally articulated lift bed.

Another object of the invention is to provide a tilt frame trailer having a rear roller and chain drive arrangement which facilitates loading and unloading containers to be transported without damage to the container undersides.

Another object of the invention is to provide such a trailer which can be connected to a general purpose truck, such as the bed of a pickup truck by means of a ball affixed to the truck bed and a "gooseneck" type coupler arrangement provided as a part of the trailer.

SUMMARY OF THE INVENTION

The trailer system of the invention is used for transporting shipping containers and includes a main support frame having a planar upper support surface, a front end and a rear end. The main support frame is tiltable between a generally horizontal position and a rearwardly inclined position for loading and unloading a container. At least one set of opposing wheels are connected to the main support frame by an axle which defines a horizontal, transverse axis with respect to the main support frame. A tilt frame, having a first extent, is connected to the main support frame by a first pivot point. The tilt frame has an opposite extent which is connectable to a hauling vehicle at a second pivot point. Actuator means connect the tilt frame to the main support frame for tilting the main support frame at an upwardly inclined angle and for simultaneously tilting the tilt frame at an opposite, upwardly inclined angle, whereby the main support frame is tilted to the rearwardly inclined position for loading and unloading a container.

Preferably, the first pivot point is located forward of the horizontal, transverse axis of the axle between the transverse axis and the front end of the main support frame of the trailer. Most preferably, the first pivot point is located forward of a mid-line drawn to bisect the horizontal length of the planar upper support surface of the main support frame as measured from the front end to the rear end thereof. The actuator means can conveniently comprise a hydraulic cylinder connected between the main support frame and the tilt frame. The tilt frame includes a connecting means, such as a trailer hitch for connection to the hauling vehicle. In one embodiment, the hauling vehicle is a truck having a rear bed and the trailer hitch is a gooseneck type connector which is pivotally connected to a ball mounted in the bed of the truck.

Additional objects, features and advantages will be apparent in the written description which follows.

BRIEF DESCRIPTION OF THE DRAWINGS

FIG. 1 is a side, partially schematic view of a container being loaded onto the hydraulic tilt trailer of the invention, certain positions of the container being indicated by dotted lines;

FIG. 2 is a side view, similar to FIG. 1 showing the container fully loaded with the tilt frame in the generally horizontal position;

FIG. 4 is an isolated, partial cross-section of the trailer hitch used for connecting the trailer to a ball mounted in the bed of a hauling vehicle;

FIG. 5 is a side, partly schematic view of the trailer hitch of FIG. 4 showing the pivotal movement thereof about the ball affixed within the bed of the hauling vehicle;

DETAILED DESCRIPTION OF THE INVENTION

Figure 3:
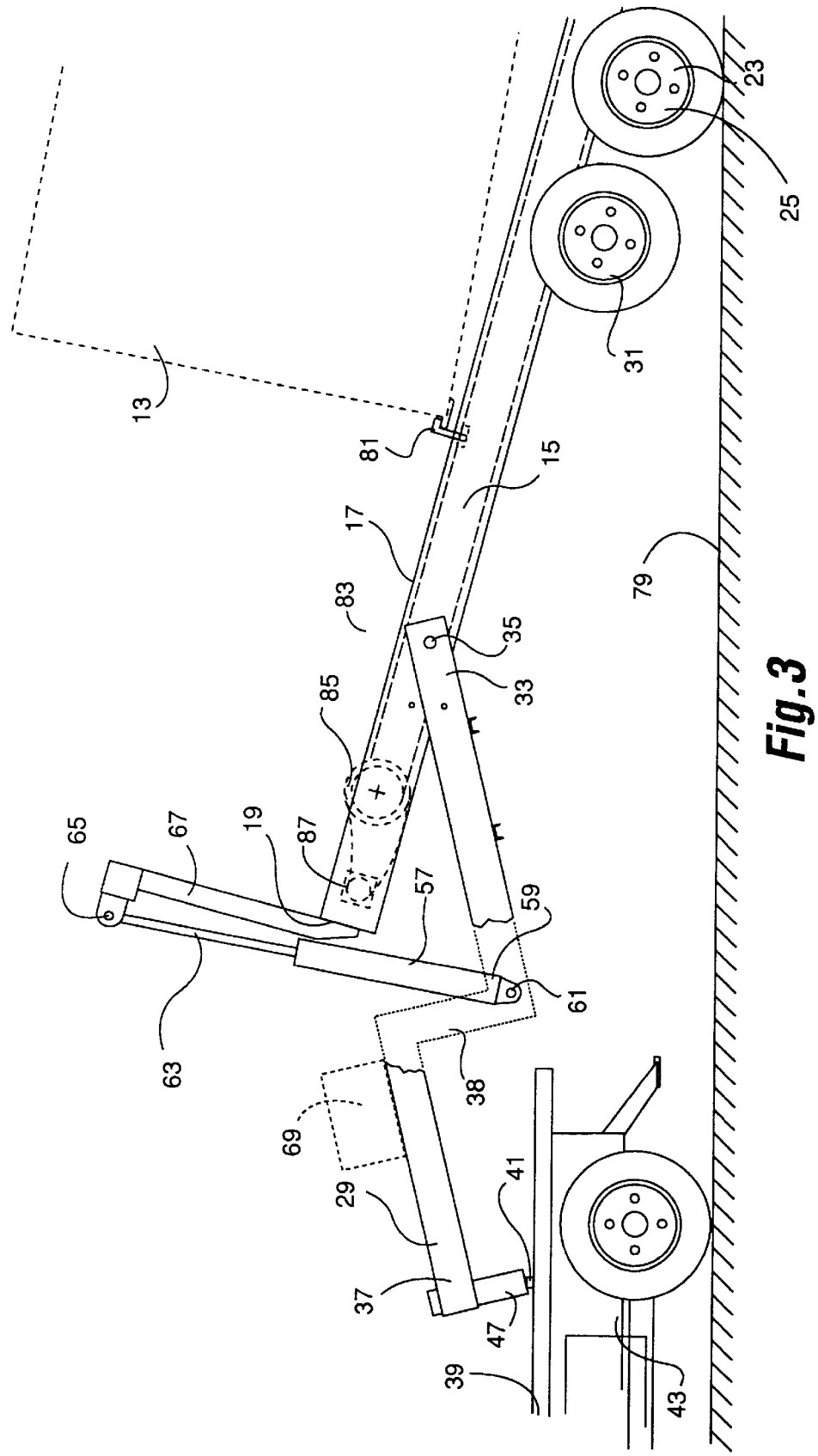
FIG. 3 is a side, close-up view of the centrally articulated tilt mechanism of the trailer of FIG. 1.
Figure 8:
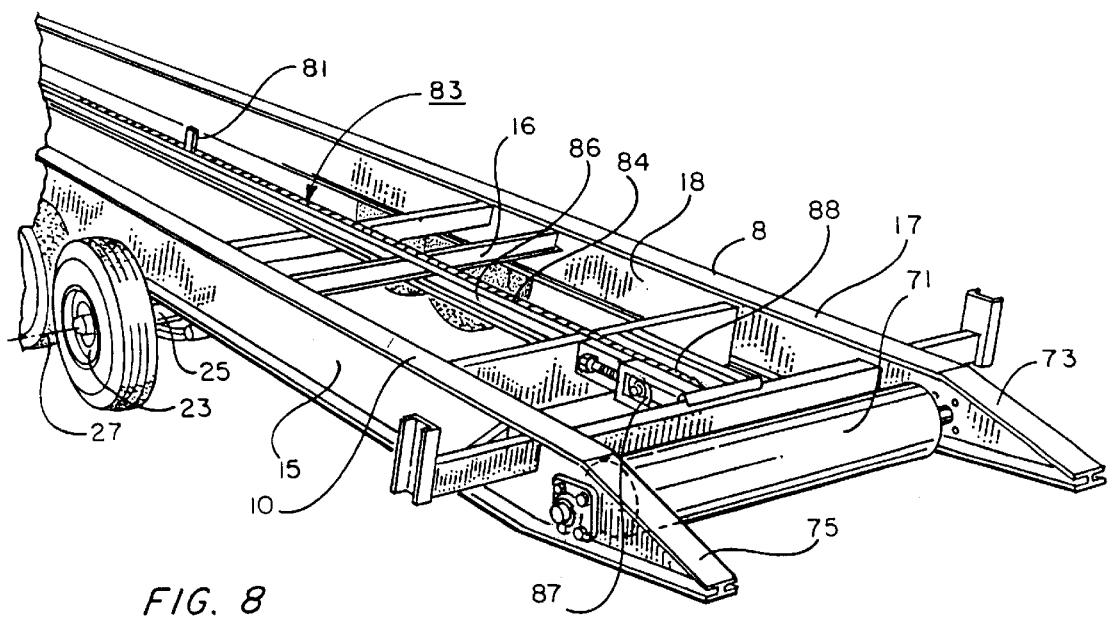
FIG. 8 is a partial, rear end view of the trailer of the invention showing the rear roller and the chain drive used for loading containers onto the main support frame.

FIGS. 1 and 2 show a hydraulic tilt trailer 11 of the invention which is used for transporting containers 13. The containers may be on the order of 40 feet long, 10 feet high and weight on the order of 9,000 pounds. In the embodiment shown, the containers are generally rectangular volumes and are not typically provided with wheel or roller systems. As shown in FIGS. 1 and 3, the trailer includes a main support frame 15 having a front end 19 and a rear end 21. The main support frame is tiltable between a generally horizontal position (FIG. 2) and a rearwardly inclined position (FIG. 1) for loading and unloading a container 13. As shown in FIG. 8, the main support frame 15 is formed by a pair of parallel 12 inch I-beams 8, 10 which are connected by a series of cross members (e.g. 16, 18) to define a platform area 17 used to support the bottom surface of the containers 13.

At least one set of opposing wheels 23 (FIGS. 1 and 2) are connected to the main support frame by an axle 25 (FIG. 8) which defines a horizontal transverse axis 27 with respect to the main support frame 15. In the preferred embodiment, a second set of wheels 31 are also mounted on the main support frame 15 in front of the primary wheels 23.

A tilt frame 29 (FIGS. 1–3) formed by a pair of parallel 10 inch I-beams connected to cross members has a first extent 33 which is connected to the main support frame 15 by a first pivot point 35. The tilt frame also has an opposite extent 37 which is connectable to a hauling vehicle 39 at a second pivot point 41. The tilt frame first extent 33 is joined to the opposite extent 37 by a vertical step 38 when viewed from the side. As seen in FIGS. 1–3, the first pivot point is located forward of the horizontal, transverse axis defined by the axle 25 of the wheels 23 so that the first pivot point lies between the transverse axis (27 in FIG. 8) and the front end 19 of the main support frame. In other words, viewing the length "$l_1$" of the main support frame 15 in FIG. 2, the first pivot point 35 is forward of a midline 36 drawn to bisect the horizontal length of the planar upper support surface 17 of the main support frame 15. In the embodiment shown, the first pivot point 35 is forward of the mid-line 36 by a distance "$l_2$".

One advantage of the trailer of the invention is that it can be used with a smaller, general purpose hauling vehicle, such as the truck 39 shown in FIGS. 1 and 2, rather than a special purpose truck or semi-rig. In fact, the trailer of the invention is connectable by means of a trailer hitch at the second pivot point 41 SO that it can be connected to a hauling vehicle having a rear bed 43 with the trailer hitch being pivotally connected to a ball 45 mounted within the bed (FIGS. 4 and 5). This can be conveniently accomplished by utilizing a hitch or connection known in certain industries as the "gooseneck" coupling. The "gooseneck" coupler 47, illustrated in the drawings, is commercially available from a number of sources. For example, typical couplers are available from The Hammerblow Corporation of El Paso, Tex. as the "Adjustable Square Gooseneck." Couplings of this general type will be familiar to those skilled in the art and are described, for example, in U.S. Pat. No. 4,320,907, issued Mar. 23, 1982; U.S. Pat. No. 4,283,073, issued Aug. 11, 1981; and U.S. Pat. No. 3,433,503, issued Mar. 18, 1969.

These commercially available hitches or couplings are utilized, for example, for hauling cattle and horse trailers where the trailer features a neck-over portion similar to the extent 37 of Applicant's tilt frame 29 and a front column structure supporting a hitch socket adapted to overlie the bed of truck vehicle at a hitch location. As shown in FIGS. 4 and 5, Applicant's coupler 47 includes the vertical channel member 48 which depends at a right angle from the tilt frame horizontal extent 37. The coupling 47 of Applicant's invention includes a pivotable locking element (49 in FIG. 4) carried within the vertical channel member 48 and latch 51 for holding the hitch coupling members in a state of engagement. As seen in FIG. 4, a latch plate 53 holds the coupling for pivotal movement on the ball 45 between the vertical position shown in FIG. 4 and a tilt position which is indicated by the angle α in FIG. 5 of approximately 15° from the vertical axis 55.

Returning to FIGS. 1–3, the trailer of the invention also has an actuator means, in this case a double acting hydraulic cylinder 57, connecting the tilt frame 29 to the main support frame 15 for tilting the main support frame at an upwardly inclined angle (FIGS. 1 and 3) and for simultaneously tilting the tilt frame 29 at an opposite, upwardly inclined angle, whereby the main support frame is tilted to the rearwardly inclined position (FIG. 1) for loading and unloading a container 13. In the embodiment of the invention shown, the hydraulic cylinder 57 is connected to the tilt frame 29 at bottom end 59 by means of a pivotal connection 61. An extendable rod 63 is connected at the top end of the actuator at an outer extent 65 to a vertical post 67 of the main support frame 15. Any convenient source of power, such as the hydraulic fluid source 69, illustrated in dotted lines in FIG. 3, can be used to extend and retract the cylinder rod 63 from within the cylinder housing 57, whereby the main support frame 15 and tilt frame 29 form the "apex", or opposite arch configuration shown in FIG. 3. While the cylinder rod 63 is being hydraulically extended from the cylinder 57, the tilt frame 29 is simultaneously pivoted about the gooseneck coupling 47 which is latched to the ball 45 in the bed of the hauling vehicle 39.

Figure 6:
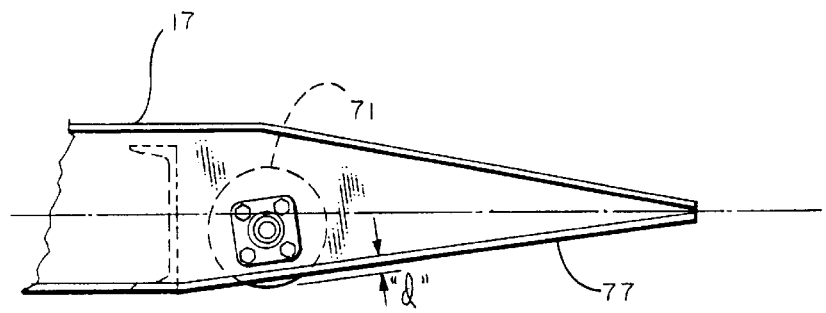
FIG. 6 is a partial, side view of the rear end of the main support frame of the trailer of FIG. 1 showing the roller thereof in dotted lines with the trailer in the generally horizontal position.
Figure 7:
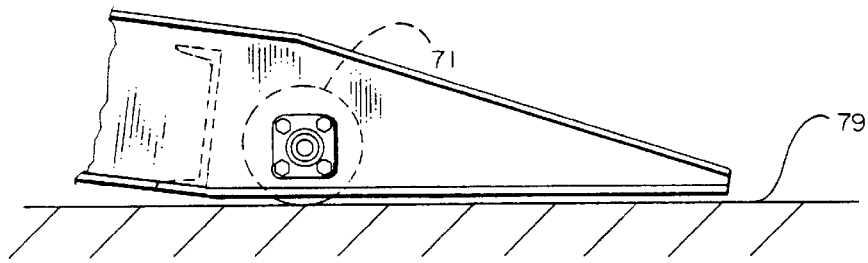
FIG. 7 is a view similar to FIG. 6 showing the position of the rear roller when the trailer main support frame is in the tilted position.

As best seen in FIGS. 6–8, the main support frame 15 has a horizontal roller 71 mounted on the rear end thereof between two downwardly sloping tail portions or flanges 73, 75 of the I-beams 8, 10. In the example shown, an 8 inch diameter roller runs perpendicular to the spaced, parallel I-beams 8, 10 and protrudes some distance "d". In this case, the roller 71 protrudes approximately ¾ inch below the surface of the bottom flange 77, allowing the roller 71 to roll on the surface 79 of the ground or surrounding substrate as the main support frame 15 is tilted to the upwardly inclined position (FIG. 7).

As shown in FIGS. 3 and 8, the main support frame 15 also includes a chain drive 83 with an upwardly extending connector (81 in FIG. 3) for engaging a container 13. Although a number of drive systems might be utilized, in the preferred embodiment, the chain drive includes a roller chain 82 similar to an oversized bicycle chain and channel members 84, 86 (FIG. 8). The roller chain 82 runs over one or more drive sprockets 85 (FIG. 3) and one or more idlers along the length of the main support frame between a chain tensioner 88, and a drive sprocket 85 driven by a hydraulic drive 87. The chain drive 83 can be powered by the same hydraulics 69 as are used to power the double acting hydraulic cylinder 57, as will be understood by those skilled in the art. The hydraulic drive 87 and drive sprocket 85 provide positive back and forth movement of the chain 82 and hence the connector 81 within the channel members 84, 86, allowing a container to be pulled forward or rearward on the upper support surfaces 17 of the main support frame.

In operation, the trailer and hauling vehicle are moved from the horizontal transport position shown in FIG. 2 to the tilt position shown in FIG. 1 by actuating the hydraulic cylinder 57. This lifts the front wheels 31 from the surrounding support surface 79. The connector 81 is then attached to the container 13 and the chain drive is actuated. Actuating the chain drive 83 actually serves to begin to pull the main support frame under the container as the hauling vehicle (in neutral) moves backward. In this way, the container 13 moves over the rear roller 71 and onto the upper planar support surfaces 17 of the main support frame without dragging the ground. The hydraulic cylinder 57 can be selectively retracted to gradually change the angular orientation of the main support frame as the container is being loaded to bring the main support frame 15 and tilt frame 29 back to the horizontal position shown in FIG. 2. Once the container has reached its forward most point of travel and the main support frame is in the horizontal position, the front end of the container will extend past the first pivot point 35 of the trailer tilt frame and the container rear end will extend past the rear end 21 of the main support frame, as shown in FIG. 2.

During the unloading operation, chain drive is driven in the opposite direction from the direction of movement during the loading operation. The container is moved far enough to the rear of the main support frame with the chain drive 83 to allow the container to contact the ground as the frame is tilted. The hydraulically driven chain drive 83 then forces the trailer and hauling vehicle (which is in neutral with the brakes off) forward to deposit the container on the ground without sliding along the surface of the ground.

An invention has been provided with several advantages. The hydraulic tilt trailer of the invention is simple in design and economical to manufacture. The combination of a tilt frame with a ball coupling allows the tilt trailer to be hauled by a general purpose truck. The use of a general purpose truck, rather than a specially design truck or semi-rig is less expensive for an operator. The centrally articulated bed, chain drive and rear roller design provide an efficient mechanism for loading and unloading freight containers.

While the invention has been shown in only one of its forms, it is not thus limited but is susceptible to various changes and modifications without departing from the spirit thereof.

What is claimed is:

1. A trailer for transporting containers, comprising:
   a main support frame having a planar upper support surface with a horizontal length, a front end and a rear end, the main support frame being tiltable between a generally horizontal position and a rearwardly inclined position for loading and unloading a container;
   at least one set of opposing wheels connected to the main support frame by an axle which defines a horizontal, transverse axis with respect to the main support frame;
   a load supporting tilt frame having a first extent which is connected to the main support frame by a first pivot point, the tilt frame having an opposite extent which is connectable to a hauling vehicle at a second pivot point, and the tilt frame having a vertical step between the first and opposite extents;
   an actuator means having a top end and a bottom end;
   the bottom end of the actuator means connected to the tilt frame at a point intermediate the first and second pivot points thereof, and the top end of the accuator means connected to the front end of the main support frame for tilting the main support frame at an upwardly inclined angle and for simultaneously tilting the tilt frame at an opposite, upwardly inclined angle, whereby the main support frame is tilted to the rearwardly inclined position for loading and unloading a container, the actuator means being primarily in a vertical position as the main support frame and the tilt frame are tilted.

2. The trailer of claim 1, wherein the first pivot point is located forward of the horizontal, transverse axis of the axle and the front end of the main support frame.

3. The trailer of claim 2, wherein the first pivot point is located forward of a mid-line drawn to bisect the horizontal length of the planar upper support surface of the main support frame.

4. The trailer of claim 1, wherein the actuator means is a hydraulic cylinder connected between the main support frame and the tilt frame.

5. The trailer of claim 1, wherein the tilt frame includes a trailer hitch for connection to a hauling vehicle.

6. The trailer of claim 5, wherein the trailer hitch is a ball receiving hitch which can be pivotally connected to a ball mounted in a bed of the hauling vehicle.

7. The trailer of claim 1, wherein the main support frame has a horizontal roller mounted on the rear end thereof which protrudes below the main support frame when the main support frame is in the horizontal position.

8. A combination hauling vehicle and trailer for transporting containers, the hauling vehicle having a rear bed with a ball coupling installed therein, the combination comprising:

a trailer main support frame having a planar upper support surface with a horizontal length, a front end and a rear end, the trailer main support frame being tiltable between a generally horizontal position and a rearwardly inclined position for loading and unloading a container;

at least one set of opposing wheels connected to the trailer main support frame by an axle which defines a horizontal, transverse axis with respect to the trailer main support frame;

a load supporting trailer tilt frame having a first extent which is connected to the trailer main support frame by a first pivot point, the trailer tilt frame having an opposite extent which is pivotally connected to the hauling vehicle at the ball coupling installed in the bed thereof, and the tilt frame having a vertical step between the first and opposite extents;

an actuator means having a top end and a bottom end;

the bottom end of the actuator means connected to the trailer tilt frame at a point intermediate the first and second pivot points thereof, and the top end of the accuator means connected to the front end of the trailer main support frame for tilting the trailer main support frame at an upwardly inclined angle and for simultaneously tilting the trailer tilt frame at an opposite, upwardly inclined angle, to form an apex configuration, whereby the trailer main support frame is tilted to the rearwardly inclined position for loading and unloading a container, the accuator means being primarily in a vertical position as the main support frame and the tilt frame are tilted.

9. The trailer of claim 8, wherein the first pivot point is located forward of the horizontal, transverse axis of the axle and the front end of the main support frame.

10. The trailer of claim 9, wherein the first pivot point is located forward of a mid-line drawn to bisect the horizontal length of the planar upper support surface of the main support frame.

11. The trailer of claim 8, wherein the actuator means is a hydraulic cylinder connected between the main support frame and the tilt frame.

12. The trailer of claim 8, wherein the main support frame has a horizontal roller mounted on the rear end thereof.

* * * * *